United States Patent [19]

Wurzburger, deceased et al.

[11] 4,164,959
[45] Aug. 21, 1979

[54] METERING VALVE

[75] Inventors: Paul D. Wurzburger, deceased, late of Cleveland Heights, Ohio, by Peter Reed, executor, Cleveland, Ohio

[73] Assignee: The Salk Institute for Biological Studies, San Diego, Calif.

[21] Appl. No.: 787,906

[22] Filed: Apr. 15, 1977

[51] Int. Cl.² ............................................. F16K 31/53
[52] U.S. Cl. ................................ 137/553; 137/599.2; 137/614.18; 137/614.21; 251/340
[58] Field of Search ..................... 251/340; 137/513.3, 137/599.2, 614.18, 614.21

[56] References Cited
U.S. PATENT DOCUMENTS

| 650,295 | 5/1900 | Boulard | 251/340 X |
| 2,999,512 | 9/1961 | Barkow | 251/340 X |
| 3,052,445 | 9/1962 | Kessler | 251/368 X |

Primary Examiner—Robert G. Nilson
Attorney, Agent, or Firm—Fitch, Even & Tabin

[57] ABSTRACT

An axial flow metering valve includes a valve body having an inlet, an outlet, a valve chamber therebetween and a passage for fluid between the inlet and the valve chamber. A valve member is movable in the valve chamber and includes a number of guide pins which extend axially through guide slots and into grooves in the valve body. The guide pins are threadedly engaged with a rotatable actuating member which encircles them. Rotation of the actuating member moves the valve member toward and away from the valve seat to regulate fluid flow. The valve member may carry a check valve member which checks reverse flow or may carry an inner bypass valve member which permits full unregulated reverse flow.

23 Claims, 14 Drawing Figures

U.S. Patent Aug. 21, 1979 Sheet 1 of 4 4,164,959
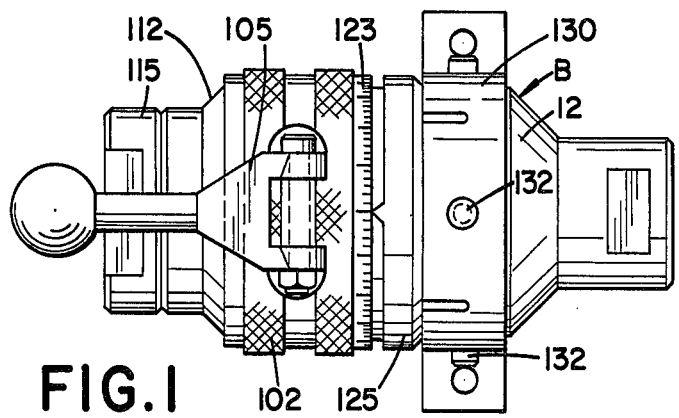
FIG.1
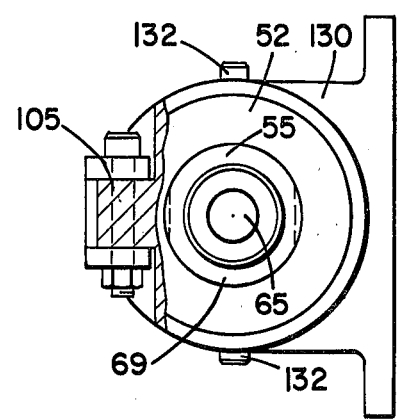
FIG.2
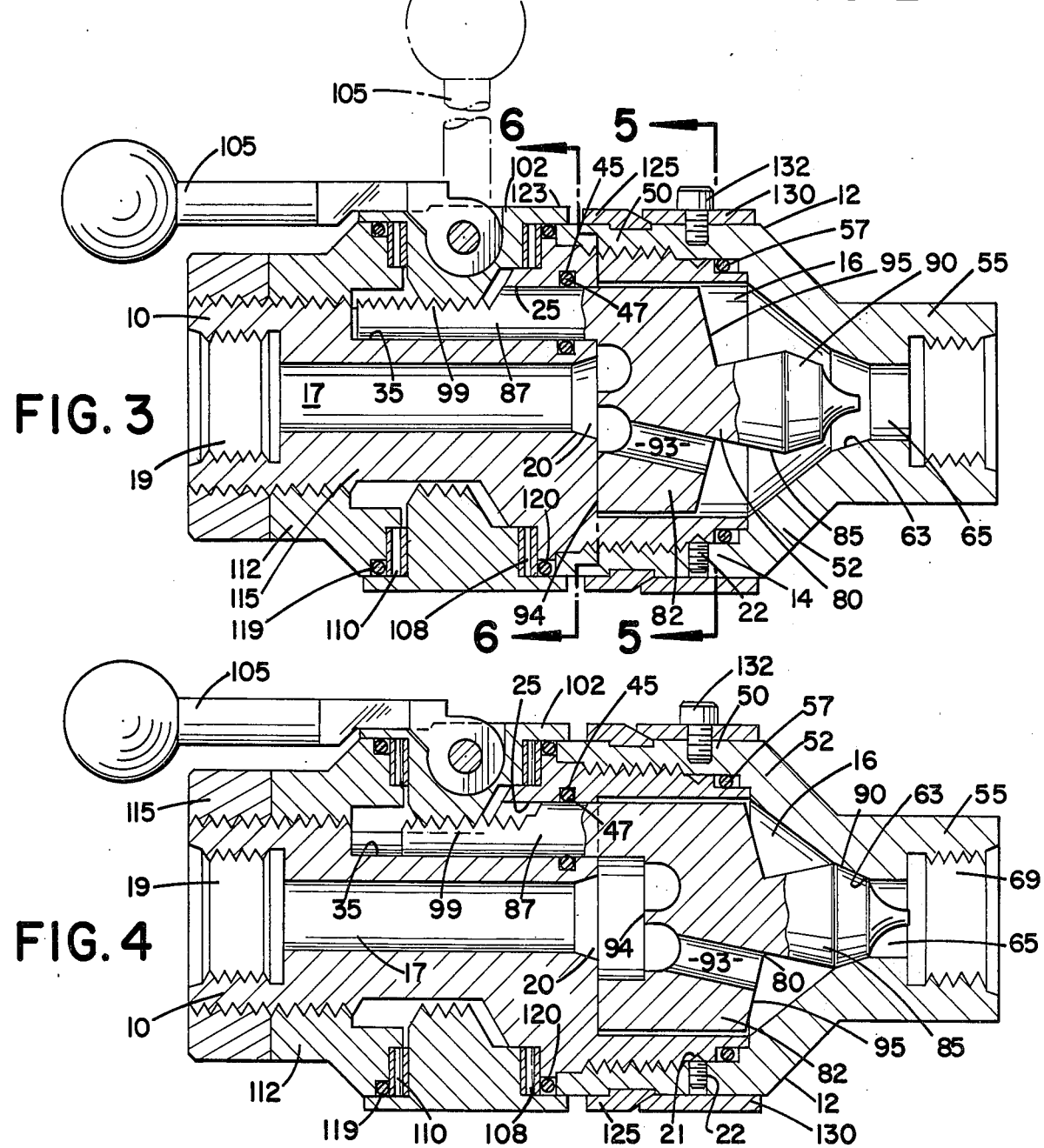
FIG.3
FIG.4

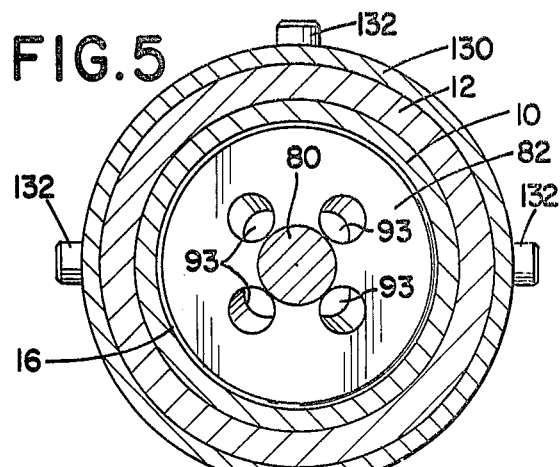
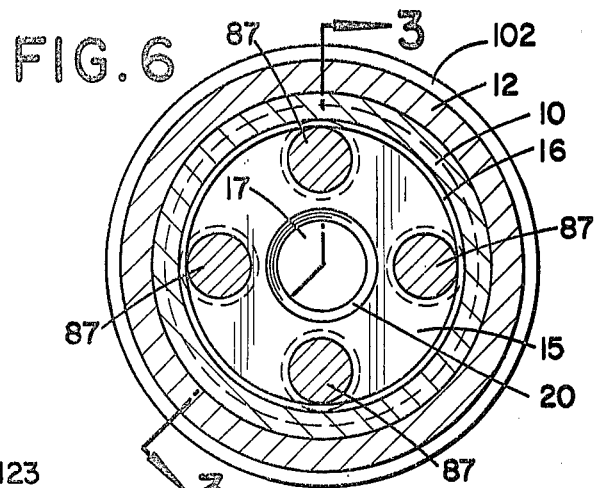
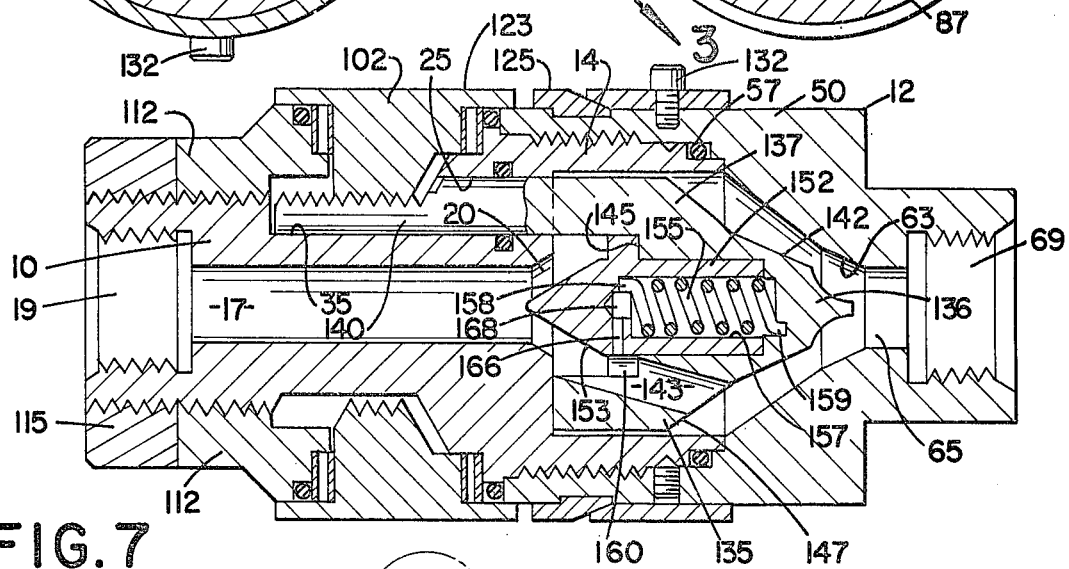
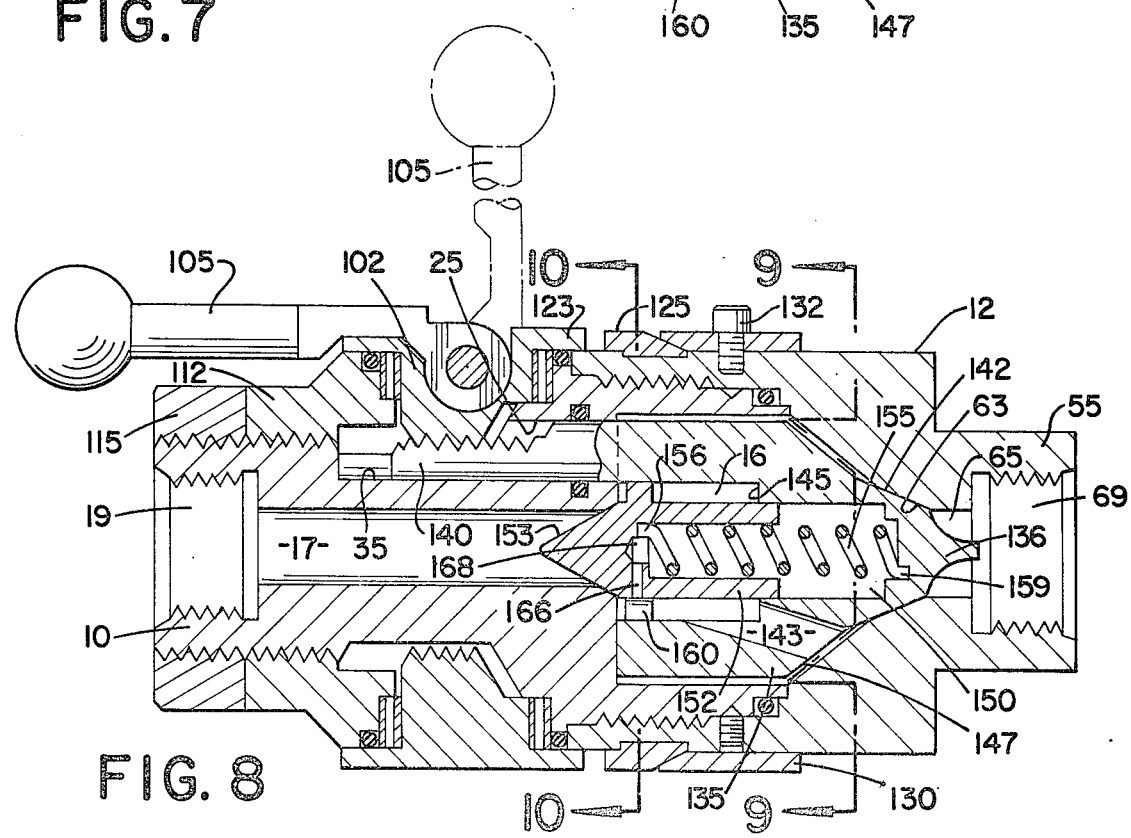

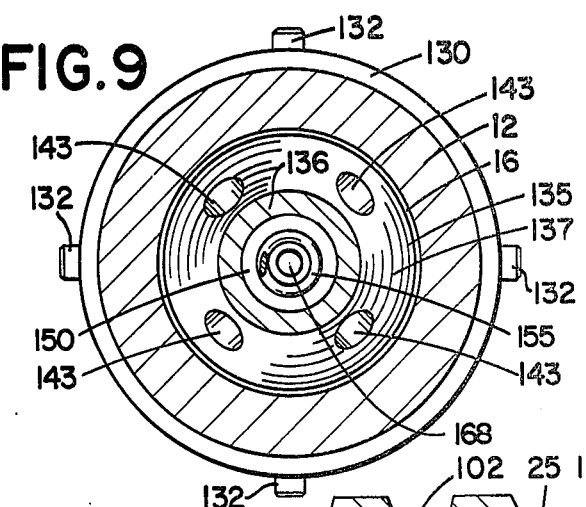
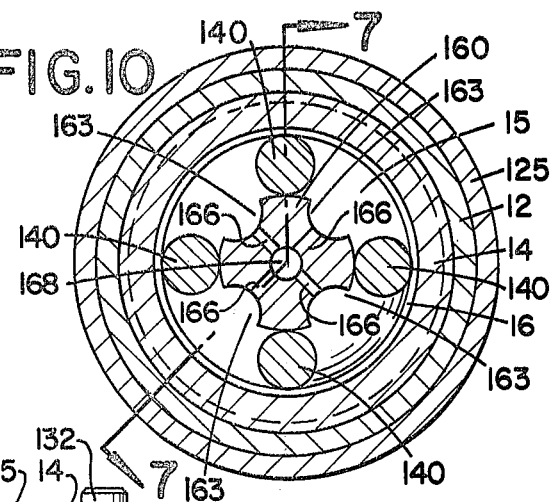
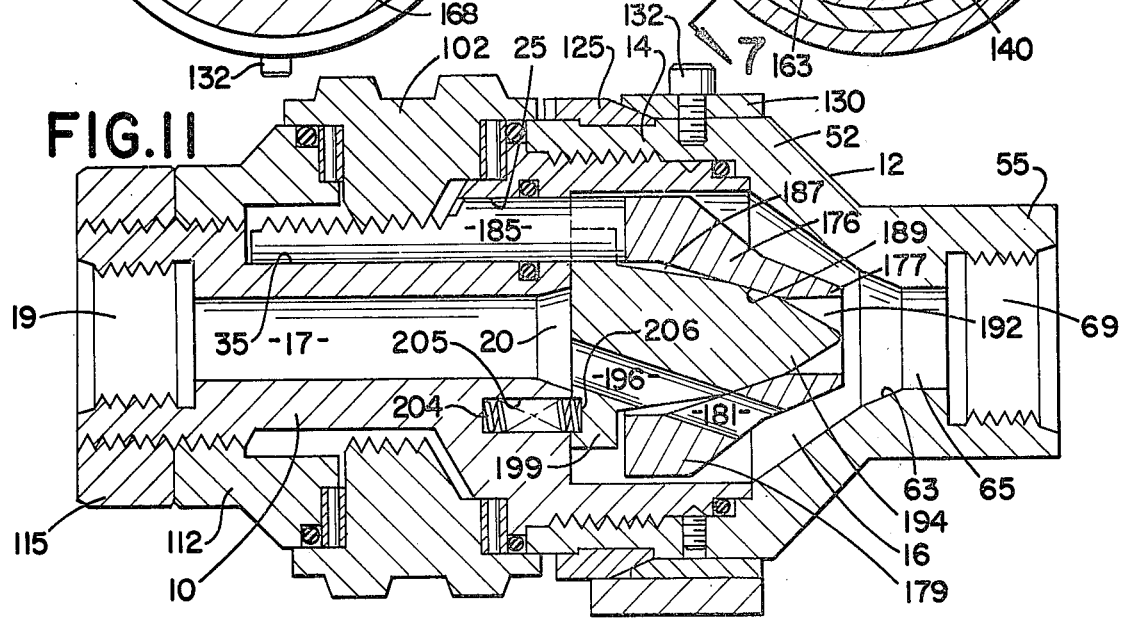
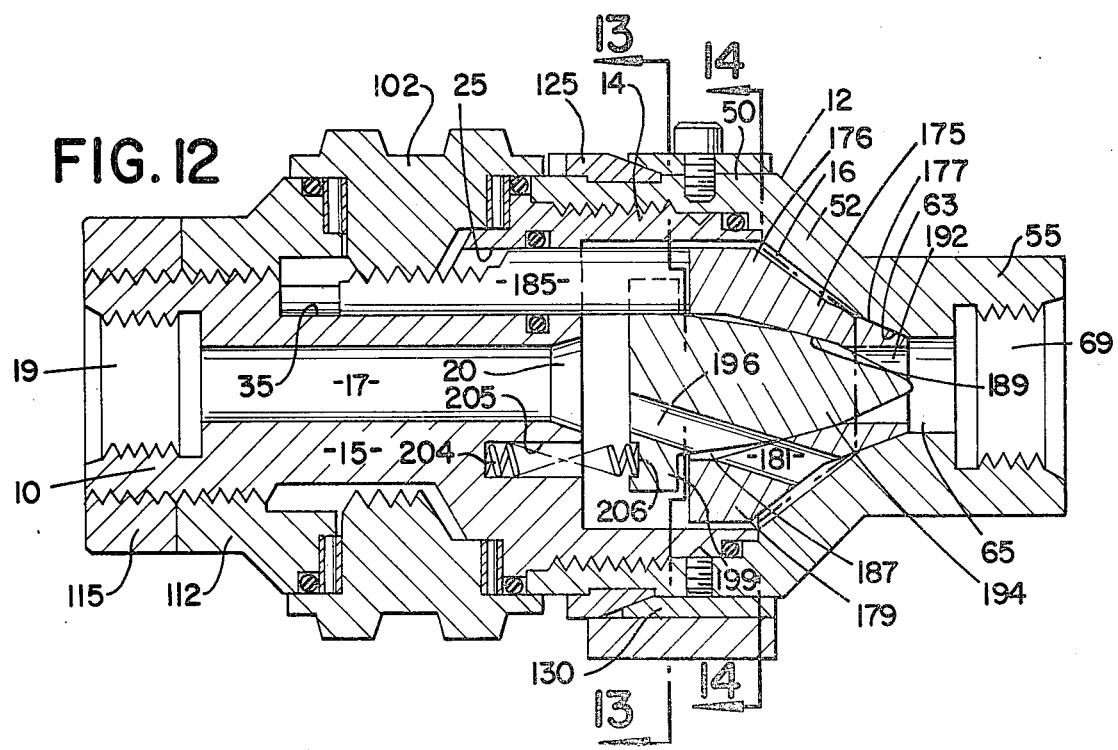

METERING VALVE

BACKGROUND OF THE INVENTION

This invention relates to metering valves and more particularly to an axial flow metering valve of improved design and performance.

Conventional metering valves generally have tapered or so-called "needle" valve members which are positioned closer to or farther from a correspondingly tapered valve seat by means of a metering adjustment in order to regulate flow through the valve. These metering valves, particularly those intended for use in high pressure applications, suffer from a number of difficulties in operation. One such difficulty is in maintaining consistent, precisely regulated flow which is predictable for a given metering adjustment. A source of this and other associated difficulties in many metering valves is a failure to maintain the tapered sealing portion of the valve member rigidly concentric with the valve seat. As the valve member is advanced or retracted it is permitted to undergo a certain amount of roll, pitch or yaw which affects the concentricity of the valve member with the valve seat. Such unwanted movement of the valve member occurs because of poor stabilization of the valve member and is accentuated when the valve member is subjected to high fluid pressures.

Another difficulty with many present metering valves having poppet-type valve members is that the valves become increasingly more difficult to open as a function of the system pressure due to the effective valve seat area being acted upon by the system fluid pressure. Further, many metering valves have reduced flow passage sizes compared with other types of valves and may have the valve seat and metering adjustment arranged perpendicular to the main flow axis which causes restriction and abrupt directional changes of flow and, therefore, a relatively high pressure drop. Still further, most metering valves fail to take into account unmetered reverse flow, either to check it or to provide for it.

SUMMARY OF THE INVENTION

A general object of this invention is to provide a metering valve which overcomes the difficulties discussed above encountered with present metering valves.

In a preferred embodiment, a metering valve according to the present invention includes a valve body having an inlet, an outlet, a valve chamber between the inlet and outlet, a passage for fluid between the inlet and the valve chamber and a valve seat in the valve chamber. At least two axially extending guide slots are provided in the valve body spaced radially from the fluid passage. A valve member is provided in the valve chamber so as to be movable toward and away from the valve seat. The valve member has a body portion and at least two guide pins extending axially from the body portion through the guide slots in the valve body. Preferably, there are more than two guide pins and a corresponding number of guide slots in the valve body. An actuating member encircles and threadedly engages the guide pins, preferably using a multi-lead thread and is rotatable so as to rapidly and minutely control the movement of the valve member toward and away from the valve seat. The valve member is guided in its movement toward and away from the valve seat by the guide pins and guide slots so that roll pitch and yaw of the valve member is substantially eliminated.

According to a more particular aspect of the invention the body portion of the valve member is of substantially the same diameter as the valve chamber and includes a plurality of fluid passages extending through it and oriented to direct fluid into the valve chamber upstream of the valve seat.

According to another particular aspect of the invention the respective areas of the valve member body portion on upstream and downstream sides thereof are substantially equal so that fluid forces acting upon these areas in the closed position of the valve are substantially equal. The valve member is thus substantially balanced as to fluid pressure and the valve is easier to open.

According to still another particular aspect of the invention the actuating member is provided with indicating marks and an adjustable pointer ring is provided adjacent the actuating member indicating marks so as to indicate the relative valve position. The total opening and closing of the valve should be accomplished within one full revolution of the actuating member in order to minimize the adjustment time and at the same time permit the indicating marks and pointer to display the actual degree of valve opening.

According to yet another particular variation of the invention the valve member carries a check valve member, the check valve member being normally biased into a seating position closing the fluid passage to reverse flow and being opened by forward fluid flow.

According to still another particular variation of the invention the valve member may carry an inner valve member which is not effective during normal fluid flow but which permits full flow in the reverse direction through the valve.

According to another particular aspect of the invention means are provided for each of said valve member, check valve member and inner valve member to prevent rotation thereof.

According to yet another particular aspect of the invention, both the check valve member and the inner valve member are provided with radially extending flanges adapted to contact the guide pins so that the respective check or inner valve member is guided axially thereby during movement.

According to still another particular aspect of the invention each of said valve member, check valve member and inner valve member is provided with a tapered sealing portion which may have a resilient coating thereon to enhance a positive seal with their respective valve seats.

These and other general and particular aspects of the present invention will become apparent in connection with the description provided below.

BRIEF DESCRIPTION OF THE DRAWINGS

FIG. 1 is a plan view of a metering valve embodying the present invention.

FIG. 2 is an end elevational view, partly in section, of the valve of FIG. 1.

FIG. 3 is a longitudinal sectional view of the valve of FIGS. 1 and 2 along the line 3—3 of FIG. 6 showing the valve in the fully open condition.

FIG. 4 is a view similar to FIG. 3 showing the valve in the fully closed condition.

FIG. 5 is a transverse sectional view along the line 5—5 of FIG. 3.

FIG. 6 is a transverse sectional view along the line 6—6 of FIG. 3.

FIG. 7 is a longitudinal sectional view along the line 7—7 of FIG. 10 of an alternate form of valve having an auxiliary check valve member, the valve being shown in the fully open condition.

FIG. 8 is a view similar to FIG. 7 showing the valve in the fully closed condition.

FIG. 9 is a transverse sectional view along the line 9—9 of FIG. 8.

FIG. 10 is a transverse sectional view along the line 10—10 of FIG. 8.

FIG. 11 is a longitudinal sectional view along the line 11—11 of FIG. 13 of a second alternate form of valve having an auxiliary reverse full flow inner valve member, the valve being shown in the fully open condition.

FIG. 12 is a view similar to FIG. 11 showing valve in the fully closed condition.

DESCRIPTION OF THE PREFERRED EMBODIMENTS

Figure 13:
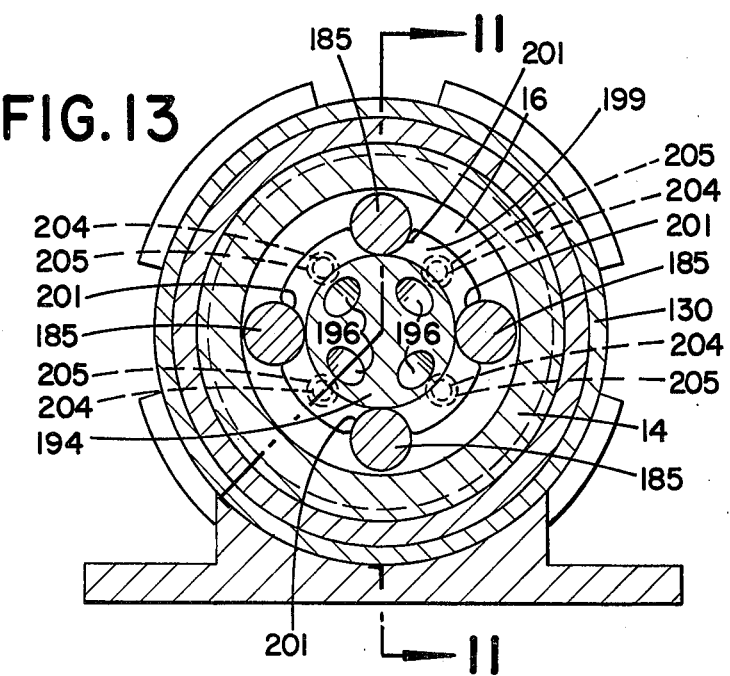
FIG. 13 is a transverse sectional view along the line 13—13 of FIG. 12.

Referring now to the drawings and initially to FIGS. 1 to 6, a basic form of valve embodying the present invention includes a valve body B having a rear body part 10 and a front body part 12. The rear body part 10 includes a forward externally threaded portion 14 of larger diameter and a central portion 15. The forward portion 14 of rear body part 10 defines with front valve body part 12 a valve chamber 16. A central fluid passage 17 extends through the rear body part 10 between the valve chamber 16 and a valve inlet 19. The fluid passage 17 is flared where it opens into the valve chamber as shown at 20. A number of circumferentially spaced guide slots 25, 4 such guide slots being illustrated, extend through the forward portion 14 of rear body part 10 and into the central portion 15. The periphery of central portion 15 is provided with circumferentially spaced grooves 35 which are continuous with guide slots 25. Narrow annular openings 45 are provided in the walls of rear body part 10 surrounding each of the guide slots 25 with an O-ring seal 47 seated in each of the openings.

The front body part 12 of valve body B includes an internally threaded large diameter portion 50 which is threadedly engaged with the front portion 14 of the rear body part 10. A circular V-shaped groove 21 is provided on front portion 14 of rear body part 10, exterially of the O-ring sealing zone to be engaged by a cone point set screw 22 inserted through the wall portion 50 of the body part 12 for mechanically locking the two body parts together, the set screw 22 being confined by the overlaying clamp bracket 130. A tapered portion 52 and a cylindrical end portion 55 extend forwardly from the large diameter portion 50 of the front body part. An O-ring seal 57 is provided to prevent leakage between the two valve body parts. Front body part 12 defines, with the front portion of rear body part 10, the valve chamber 16. At the forward end of the valve chamber is a tapered valve seat 63. Forwardly of the valve seat is an outlet passage 65 which leads to a valve outlet 69.

A poppet valve member generally designated 80 is positioned within valve chamber 16 and is movable therein toward and away from valve seat 63. Valve member 80 includes a generally cylindrical body portion 82, a forwardly extending valve head 85 and a number of rearwardly extending circumferentially spaced guide pins 87. The valve head 85 has a tapered sealing portion 90 which cooperates with valve seat 63 to regulate or prevent flow through the valve. Preferably, at least the tapered portion 90 of the valve head is covered by a layer of plastic, vinyl or similar material to enhance the seal with the valve seat 63.

The body portion 82 of the valve member is provided with a number of circumferentially spaced slanted passages 93, four being shown, which extend from the upstream face 94 of the valve member through to the downstream face 95 adjacent the valve head 85. Preferably, the projected area of the downstream face 95 of the valve member body portion 82 is substantially equal to the area of the upstream face 94. This is desirable so that in the closed position of the valve the same fluid pressure will act upon these substantially equal areas. As a result, the valve member will not be subjected to any substantial unbalanced force tending to seat it and making it difficult to open.

The guide pins 87 extend rearwardly from the body portion 82 of the valve member through the guide slots 25 in rear valve body part 10 and into the grooves 35. Each guide pin 87 is partially threaded as shown at 99 and engages corresponding threads of a valve actuator 102 which encircles the guide pins and the rear valve body part 10. Actuator 102 may be rotated by means of a movable handle 105 to cause the guide pins 87 and valve member 80 to move forwardly or rearwardly. The handle 105 may be pivoted to swing 90° to a folded position in order that it may clear obstructions and also to minimize the danger of its being accidentally moved out of its desired position. Actuator 102 is rotatable between a needle bearing assembly 108 which abuts the front portion 14 of rear body part 10 and a second needle bearing assembly 110. The actuator 102 and the bearing assemblies are retained in position by a thrust ring 112 which is threaded onto rear body part 10. The thrust ring is held in position by a jam ring 115 which is threaded onto the end of body part 10 behind the thrust ring. O-ring seals 119 and 120 are provided adjacent the respective needle bearing assemblies 108 and 110 for frictional drag and for contamination barriers.

The outer surface of actuator 102 at 123 is provided with micrometer markings in the form of a scale graduated from 0 to 100. A pointer ring 125 encircles front body part 12 immediately adjacent the micrometer scale 123 of actuator 102. The pointer ring is held in position by a slotted clamp bracket 130. The clamp bracket is connected to front body part 12 of the valve body by means of threaded members 132 and may be used for mounting the valve.

In operation, the valve is calibrated by positioning the pointer ring 125 so that pointer 127 indicates zero on micrometer scale 123 when the valve is fully closed and 100 when the valve is fully opened. The reading on scale 123 will thereafter indicate the percent of axial retraction of the valve from its seat, on a scale of zero to 100. The valve may be connected in a line by means of the threads in inlet opening 19 and outlet opening 69. Fluid enters the valve through inlet 19 and flows through passage 17 and slanted passages 93 in valve member 80 into the forward portion of valve chamber 16. From the valve chamber the fluid flows through the space between valve head 85 and valve seat 63 and exits the valve through outlet 69. The volume rate of flow is determined by the micrometer setting of actuator 102 and may be changed as conditions dictate.

The valve of this invention is suited to high pressure applications and does not become increasingly more difficult to open with increasing fluid pressure. This, because the valve member is substantially balanced as to fluid pressure when the valve is closed as described above. Further, in the present valve the axial path of the valve member and its concentricity with the valve seat are not varied by high fluid pressure or any other means. The use of guide pins which travel in guide slots and are spaced radially outwardly from the center of the valve body allows very precise centering of the valve head with respect to the valve seat. The support provided by the guide slots insures excellent repeatability of valve member movement with essentially no roll, pitch or yaw. The sealing portion of the valve head, therefore, remains concentric at all times with the conical valve seat. The use of a threaded connection between the actuator and the guide pins provides excellent repeatability of the selected valve opening.

A second embodiment of the present invention is shown in FIGS. 7 to 10 in which the same reference numerals employed in FIGS. 1 to 6 are used to designate common parts. The structure of the valve of FIGS. 7 to 10 is essentially the same as that of the valve of FIGS. 1 to 6 with the exception of the valve member which is generally identified by the numeral 135 in FIGS. 7 to 10.

Valve member 135 includes a valve head 136, a body portion 137 and guide pins 140. As in the valve of FIGS. 1 to 6, guide pins 140 extend through guide slots 25 which are spaced radially outwardly from fluid passage 17 in rear valve body part 10. Valve head 136 includes a tapered sealing portion 142 which, as in the embodiment of FIGS. 1 to 6, may be provided with a resilient coating to effect a more positive seal with valve seat 63. The central body portion 137 of valve member 135 is provided with a number of slanted fluid passages 143 which extend from the upstream face 145 of the valve member body portion to the downstream face 147. These passages correspond to passages 93 in the valve of FIGS. 1 to 6.

Extending axially inwardly from upstream face 145 of valve member body portion 137 is a counterbore 150 in which is positioned a check valve member 152. The check valve member has a conical face 153 which seats in the conically flared portion 20 of fluid passage 17 to close the passage. Check valve member 152 is biased to the closed position by a coiled spring 155 which seats within an axial counterbore 157 in the check valve member. One end of spring 155 is anchored in the counterbore 157 by means of a notch 158 at the end of the counterbore while the opposite end is anchored in a similar notch 159 at the end of counterbore 150. The spring 155 thereby prevents check valve member 152 from rotating as it moves toward and away from the fluid passage 17.

The check valve member 152 is provided with a radially projecting guide flange 160 the periphery of which contacts the lower surfaces of guide pins 140 as shown in FIG. 10. This contact between guide flange 160 and the guide pins 140 insures that check valve member 152 moves axially without pitch or yaw so that conical face 153 is always concentric with the conically flared portion 20 of fluid passage 17. The guide flange 160 is provided with a number of peripheral grooves or notches 163 (FIG. 10) which are spaced between guide pins 140 and aligned with the slanted passages 143 in valve member 135. These grooves allow fluid to flow to passages 143 without obstruction by guide flange 160. A number of passages 166 extend radially from a small diameter blind bore 168 in the center of the check valve member to the grooves 163. The blind bore 168 communicates with the counterbores 150 and 157 in the check valve members. The radial passages 166 provide a path for escape of fluid from the counterbores 150 and 157 to valve chamber 16 and the slanted passages 143 when the check valve member is moved away from its seat 20. This prevents movement of the check valve member from being retarded unduly by fluid accumulated in counterbores 150 and 157.

In normal operation, check valve 152 is moved away from its seat to the position shown in FIG. 7 by the pressure of incoming fluid. This fluid passes then through slanted passages 143 and the opening between valve head 136 and valve seat 63 and exits through the valve outlet. Should the fluid pressure at the outlet of the valve become greater than that at the inlet the check valve 152 will become seated and prevent reverse flow through the valve. As in the valve of FIGS. 1 to 6, the upstream and downstream areas of the valve member acted upon by fluid pressure in the closed position of the valve are preferably substantially equal. The valve member is, therefore, movable from the closed to the open position without excessive effort even at high fluid pressures.

Figure 14:
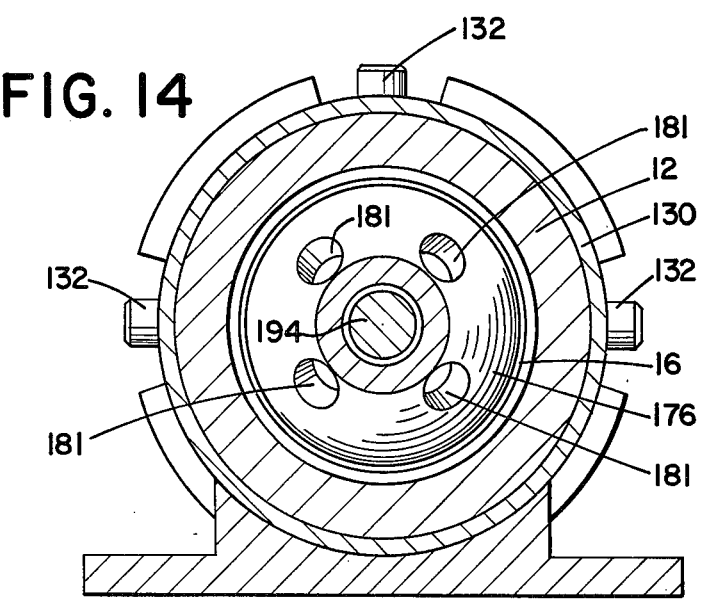
FIG. 14 is a transverse sectional view along the line 14—14 of FIG. 12.

A third valve embodying the present invention is shown in FIGS. 11 to 14 in which the same reference characters employed in FIGS. 1 to 6 and 7 to 10 are used to identify common parts. The valve of FIGS. 11 to 14 is essentially the same as the valve of FIGS. 1 to 6 and of FIGS. 7 to 10 with the exception of the valve member which is generally designated 175. Valve member 175 includes a tubular outer valve member 176 having a tapered valve head 177 which cooperates with valve seat 63 for metering fluid flow in the forward direction, from inlet 19 to outlet 69. Outer valve member 176 also includes a central body portion 179 with a number of slanted passages 181 through it. A number of guide pins 185, four being shown, extend rearwardly from the body portion 179 of the outer valve member and through guide slots 25 as in the embodiments previously described.

The hollow interior of outer valve member 176 includes an inner valve chamber 187 with a tapered inner valve seat 189 and an inner valve outlet 192. Within inner valve chamber 187 is an inner valve member 194 having a tapered portion which seats on inner valve seat 189. The inner valve member is provided with a number of slanted passages 196 corresponding to the number of slanted passages 181 through outer valve member 176. Passages 196 extend from the upstream face of inner valve member 194 through the inner valve member in alignment with the respective slanted passages 181 in outer valve member 176.

At the rearward end of inner valve member 194 is a radially projecting flange 199 having a number of grooves or notches 201 (FIG. 13) in its periphery. The number and size of grooves 201 correspond to the number and size of guide pins 185 which fit within and are movable with respect to the grooves. Inner valve member 194 is normally biased onto inner valve seat 189 by means of coiled springs 204 positioned in counterbores 205 in rear valve body part 10. The springs are retained within holes 206 in the upstream face of inner valve member 194. Preferably, the number of springs 204 is selected according to the number of guide pins 185.

As in the valve embodiments previously described, the positioning of guide pins 185 within guide slots 25 prevents rotation of outer valve member 176 as well as guiding the axial movement of the valve member so that the valve head is always concentric with the valve seat. Guide pins 185 also, by virtue of their fit within grooves 201, prevent rotation of the inner valve member and guide it so that it is always concentric with inner valve seat 189. Prevention of rotation of the inner valve member is important for maintaining the desired valve seating relationship and also for alignment of the flow passages 196 in the inner valve member with the flow passages 181 in the outer valve member and for preventing twisting or misalignment of the biasing springs 204 within the counterbores 205.

In operation, the springs 204 are aided in seating inner valve member 194 during forward metered flow by the pressure of fluid through passage 17 acting upon the upstream face of the inner valve member. Operation of the valve is not affected by the inner valve member during normal forward flow. The valve member 175 may be positioned for the desired rate of flow by means of actuator 102 as described above. Should, however, the pressure at valve outlet 69 become higher than at valve inlet 19 reverse flow will occur. Such flow will be entirely through inner valve chamber 187 if the outer valve member 176 is closed with somewhat less flow in that path as when the outer valve is fully open. Thus, in the valve embodiment of FIGS. 11 to 14 full flow is provided in the reverse direction through paths provided by the metering position of outer valve member 176 and the unseating of inner valve member 194.

While preferred embodiments of the present invention have been specifically disclosed and described in detail herein, it will be apparent to those of skill in the art that other forms and embodiments may be made without departing from the essential principles of this invention. Accordingly, this invention is not to be limited to the embodiments herein specifically disclosed.

What is claimed is:

1. An axial flow metering valve comprising a valve body having an inlet, an outlet and a valve chamber between said inlet and outlet, said valve body including first and second body parts, said first body part having a passage for fluid between said inlet and said valve chamber and at least two axially extending guide slots spaced radially from said fluid passage, a valve seat in said valve chamber, said valve seat being formed in said second body part, a valve member in said valve chamber movable toward and away from said valve seat, said valve member having a body portion with at least two guide pins extending axially from said body portion through said guide slots, the number of said guide pins corresponding to the number of said guide slots, each guide pin having a continuing segment of an encompassing thread, and an actuating member surrounding and threadedly engaging said guide pins, whereby said actuating member while being axially restrained is rotatable to move said valve member toward and away from said valve seat.

2. A valve as claimed in claim 1 wherein said actuating member and guide pins are threadedly engaged by a multi-lead thread whereby total valve opening and valve closing is accomplished within one full rotation of the actuating member.

3. A valve as claimed in claim 1 wherein said first body part includes a larger diameter axially forward portion and an adjacent smaller diameter portion, and including a plurality of said guide slots in said larger diameter portion.

4. A valve as claimed in claim 3 including a plurality of grooves in the periphery of said smaller diameter portion continuous with said guide slots, said guide pins extending through said guide slots and into said grooves, said actuating member surrounding said smaller diameter portion and threadedly engaging said guide pins.

5. A valve as claimed in claim 1 wherein said valve member is a poppet valve member.

6. A valve as claimed in claim 1 including a check valve member carried by said valve member, said check valve member being normally biased into a seating position closing said fluid passage to reverse flow and being opened by forward fluid flow.

7. A valve as claimed in claim 6 wherein said check valve member is positioned in a central axial counterbore of said valve member and has a spring-receiving counterbore, and including a spring in said spring receiving counterbore for biasing said check valve member.

8. A valve as claimed in claim 7 including means in said counterbore of said valve member and means in said counterbore of said check valve member for anchoring the ends of said spring to prevent rotation of said check valve member with respect to said valve member.

9. A valve as claimed in claim 7 wherein said check valve member is provided with a radially extending passage intersecting said spring-receiving counterbore to permit escape of fluid therefrom and to enable quick opening of said check valve member.

10. A valve as claimed in claim 6 wherein said check valve member includes a radially extending flange adapted to contact said guide pins to be guided axially thereby during movement of said check valve member.

11. A valve as claimed in claim 10 including a plurality of fluid passages extending through said valve member body portion oriented to direct fluid into said valve chamber upstream of said valve seat, and wherein said flange is provided with a plurality of peripheral notches aligned with said fluid passages to permit fluid flow thereto.

12. A valve as claimed in claim 6 wherein said check valve member includes a tapered sealing portion having a resilient coating thereon to enhance a positive seal of said fluid passage.

13. A valve as claimed in claim 1 wherein said body portion of said valve member is tubular and includes an inner valve chamber and an inner valve seat, and further including an inner valve member in said inner valve chamber and means normally biasing said inner valve member onto said inner valve seat, said inner valve member being opened by flow of fluid from said outlet to said inlet of said valve body.

14. A valve as claimed in claim 13 wherein said biasing means includes at least one socket in said valve body adjacent to each of said fluid passages, and springs in said sockets biasing said inner valve member toward said inner valve seat.

15. A valve as claimed in claim 13 wherein said inner valve member includes a tapered sealing portion at one end having a resilient coating thereon to enhance a positive seal with said inner valve seat, said inner valve member having a radially extending flange at its opposite end.

16. A valve as claimed in claim 15 wherein said radially extending flange is provided with a plurality of peripheral notches at locations corresponding to said guide pins, said notches contacting said guide pins to maintain axial alignment of said inner valve member with said inner valve seat during movement of said inner valve member.

17. A valve as claimed in claim 13 including a plurality of fluid passages extending through said valve member body portion and oriented to direct fluid into said valve chamber upstream of said valve seat, and wherein said inner valve member is provided with fluid passages which are aligned with those in said valve member body portion when said inner valve member is seated on or retracted from said inner valve seat.

18. An axial flow metering valve comprising a valve body having an inlet, an outlet, a valve chamber between said inlet and outlet, a passage for fluid between said inlet and said valve chamber, and a valve seat in said valve chamber, at least two axially extending guide slots in said valve body spaced radially from said fluid passage, a valve member in said valve chamber movable toward and away from said valve seat, said valve member having a body portion of substantially the same diameter as said valve chamber, a plurality of fluid passages extending through said valve member body portion and oriented to direct fluid into said valve chamber upstream of said valve seat, said valve member body portion having at least two guide pins extending axially from said body portion through said guide slots, the number of said guide pins corresponding to the number of said guide slots, each guide pin having a continuing segment of an encompassing thread, and an actuating member surrounding and threadedly engaging said guide pins, whereby said actuating member while being axially restrained is rotatable to move said valve member toward and away from said valve seat.

19. A valve as claimed in claim 18 wherein the areas of said valve member body portion on upstream and downstream sides thereof exposed to fluid pressure are substantially equal, whereby fluid forces acting upon said areas in the closed position of the valve are substantially equal.

20. A valve as claimed in claim 18 wherein said valve member body portion includes a forwardly extending tapered sealing portion for cooperation with said valve seat, said tapered portion having a resilient coating thereon to enhance positive sealing.

21. A valve as claimed in claim 18 wherein said actuating member is provided with indicating marks, and including a readily orientable axially and circumferentially restrained pointer ring adjacent said actuating member for cooperation with said indicating marks to indicate the degree of opening of said valve.

22. A valve as claimed in claim 18 including a handle for moving said actuator member to operate said valve.

23. A valve as claimed in claim 22 wherein said handle is pivotable.

* * * * *